3,055,781
COMPOSITE PROPELLANTS
Akira Yamamoto, 70 Okihama, Aboshi-ku, Himeji-shi,
Hyogo-ken, Japan
No Drawing. Filed Nov. 19, 1958, Ser. No. 774,831
Claims priority, application Japan, Nov. 28, 1957
6 Claims. (Cl. 149—19)

The present invention relates to a composite propellant which comprises, as the fuel component thereof, at least one formaldehyde polymer which is solid at room temperature, as the oxidizing component thereof at least one oxidizing salt whose anion may be $NO_3^-$, $ClO_4^-$ or $MnO_4^-$, and a binder which may also act as part of the fuel component.

An object of this invention is to provide a composite propellant which satisfactorily fulfills the three essential requirements of moldability, ignitability and combustibility, and the possession of a high specific impulse simultaneously.

Another object of this invention is to provide a composite propellant which has an excellent specific impulse as well as good combustibility.

The formaldehyde polymer to be used in the composite propellant of my invention substantially means any polymer selected from the group consisting of polyoxymethylene glycols, paraformaldehyde, polyoxymethylenes, trioxane, and the diacetate, dimethyl ether and isocyanate derivatives of polyoxymethylenes and paraformaldehyde, and mixtures thereof.

The oxidizing component of the composite propellant may be any inorganic salt whose anion is $NO_3^-$, $ClO_4^-$ or $MnO_4^-$. It is preferable that the oxidizing component be one whose effective oxygen content is great while the average molecular weight of its combustion products is small. Therefore, among these types of salts those whose cation is $NH_4^+$, $Li^+$, $Na^+$, $K^+$, or $Mg^{++}$ are especially useful. The use of such compounds as $NOClO_4$ and $(NH_4OH)ClO_4$ as oxidizing compounds is said to be under study, and these are also believed to be usable as oxidizing components in the present invention.

Heretofore, composite propellants have been known, such as, a composite consisting of approximately 75 parts by weight of potassium perchlorate as the oxidizer and approximately 25 parts by weight of asphalt and fats as the fuel, a composite consisting of approximately 80 parts by weight of ammonium perchlorate as the oxidizer and approximately 20 parts by weight of resin binder as the fuel, and a composite consisting of approximately 45 parts by weight of powdered sodium nitrate as the oxidizer, approximately 45 parts by weight of powdered ammonium picrate and approximately 10 parts by weight of resin binder.

These heretofore known composite propellants, however, were not able to completely satisfy simultaneously the three essential conditions of moldability, ignitability and combustibility, and the possession of a high specific impulse; and therefore, were nothing but more or less suitable compromises of the three conditions.

However, what is required of a composite propellant is that the above three conditions be fully satisfied simultaneously.

I have found that a composite propellant which comprises, as the fuel component thereof, at least one formaldehyde polymer which is solid at room temperature, as the oxidizing component thereof, at least one oxidizing salt whose anion may be $NO_3^-$, $ClO_4^-$, or $MnO_4^-$, and a binder which may also act as a part of the fuel component has excellent combustibility, and moreover that this composite propellant fulfills satisfactorily each of the above requirements of moldability, ignitability and combustibility, and the possession of a high specific impulse. When the formaldehyde polymers account for more than 10% of the weight of the fuel component, the excellent combustion property of the composite propellant is manifested conspicuously. In most cases, the fuel component occupies 20% or more of the weight of the composite propellant. Hence, the formaldehyde polymers accounts for 2% or more by weight of the composite propellant, and thus the above excellent quality becomes notable, it being especially remarkable when the amount of the polymers is 5% or more by weight of the composite propellant.

The amount of oxysalt present in the composite propellant should preferably be at least 40% of the theoretical amount required for the complete oxidation of the formaldehyde polymer or polymers, in which case the above three conditions are not only satisfied, but extremely excellent results are also shown with respect to the specific impulse. In this instance, the proportion of the formaldehyde polymer or polymers accounts for 60% or less of the weight of the composite propellant. Particularly, when the oxidizing component consists of only one of the below-listed salts, the amount by weight that the formaldehyde polymer or polymers occupy in the composite propellant should preferably be of a value less than that as follows.

| Type of oxidizing agent: | Percentage accounted for by formaldehyde polymers |
|---|---|
| $NH_4NO_3$ | [1] 31.9 |
| $NaNO_3$ | [1] 52.5 |
| $KNO_3$ | [1] 48.2 |
| $Mg(NO_3)_2$ | [1] 55.9 |
| $LiNO_3$ | [1] 57.7 |
| $NH_4ClO_4$ | [1] 44.4 |
| $KClO_4$ | [1] 52.0 |
| $LiClO_4$ | [1] 58.5 |
| $KMnO_4$ | [1] 37.2 |

[1] Less than.

As is apparent from the foregoing, the ignition and combustibility of the composite propellants embodying this invention are exceedingly good, and, due especially to the fact that the combustion is stable even under atmospheric pressure, it is considered that there is no need for further improvement of the combustion performance at low pressures. Therefore, it is possible to select the combustion pressure that would give the optimum performance in flight and thus do away with the restriction imposed by the combustion pressure limitation of the propellant. Furthermore, the combustion proceeds very smoothly and the completeness of the combustion of composite propellants embodying my invention excels that achieved with all previously known composite propellants. In the conventional composite propellants, in order to enhance the moldability and the durability when a plentiful amount of fuel-binder is added, the ratio of the fuel to the oxygen donor is greatly increased, causing a decrease in the specific impulse. Thus, such existing propellants have the disadvantage that it is impossible to satisfy both the requirements for good moldability and durability as well as the possession of a high specific impulse. Since, in the composite propellants embodying my invention, the formaldehyde polymers possess especially high fuel values and moreover, the enthalpies of said polymers are comparatively high, the specific impulses of such propellants are higher than those of the conventional composite propellants.

When formaldehyde polymers are used, the interception of heat from the surface to the interior portion of the propellant is excellent and thus permits of orderly combustion from the surface, so that the combustion can be carried out in a stable manner even though an explosive is added which often causes detonation during combustion. As a result, it is possible to add an explosive of high performance in order to attain a high specific impulse.

In the composite propellant of my invention, in addition to the formaldehyde polymers used as the fuel component thereof there may be employed any other combustible fuels, catalysts such as sodium bichromate, and the like, which are normally used in such propellants. Examples of such combustible fuels are metallic powders such as magnesium, aluminum, beryllium, etc., boron hydrides, and alkyl borons. Further binders which may be employed other than the formaldehyde polymers forming part of the fuel component are polysulfide rubber, urethane rubber, polyesters and epoxy-resins. As combustible fuels, explosives such as hexogen, TNT, ammonium picrate, PETN (pentaerythritol tetranitrate), may also be added to the composite propellant of my invention. Inasmuch as the addition of the abovementioned materials to the oxidizing component and formaldehyde polymers brings about a change in the performance of the composite propellant, whether the addition of these materials in great amounts is desirable or not should be given critical study. When these materials account for the maximum of 40% of the weight of the composite propellant and the sum total of the above oxysalts as the oxidizing component and the formaldehyde polymers as the fuel component accounts for the minimum of 60% of the weight of the composite propellant, the aim of the present invention will be achieved. The minimum amount of the oxidizing agent in the composite propellant is thus determined to be no less than 24% by weight of the composite propellant.

I have also found that some of the formaldehyde polymers act both as a fuel and as a binder. Such formaldehyde polymers are illustrated by eu-polyoxymethylene, so-called Delrin resin, and polyurethanes of polyoxymethylene glycols, including paraformaldehyde. Generally formaldehyde polymers which have plasticity can be used as a fuel-binder in the composite propellants of my invention. It should be understood that when formaldehyde polymers have been already polymerized, they may be added to the other compounds of the propellants before or after heating and softening them to facilitate the formation of the propellants, and when the formaldehyde in the monomeric form is used, it may be polymerized after pouring it with the other components of the propellant into the mold.

The following examples in which parts are given by weight are illustrative of the invention and are given in addition to those already set forth above.

EXAMPLE 1

A finely powdered mixture of 10 parts of paraformaldehyde and 80 parts of ammonium nitrate was heated to 60° C. and to this mixture were added 7 parts of liquid epoxy compound and 3 parts of liquid polysulfide. This resulted in a soft pasty mixture. This mixture was poured into a mold and cooled. It was hardened by leaving it in the mold for approximately 96 hours. The product thus obtained had a specific impulse of 190 seconds at a combustion chamber pressure of 70 atmospheres.

EXAMPLE 2

Eu-polyoxymethylene, a formaldehyde polymer which was polymerized at an approximate temperature of $-80°$ C., was used. 240 parts of the eu-polyoxymethylene were made into sheet form and were calendered with hot rollers. To this were added gradually 554 parts of potassium perchlorate, while kneading the mixture thoroughly to obtain the maximum homogeneity possible. In this instance, the higher the temperature of the hot rollers up to 150°–170° C., the smaller the mechanical external force needed for the processing. From the sheet thus obtained, the required amount was cut off, packed into a mold, and was formed by heating for approximately 15 minutes at 120° C. under a pressure of 300 kg./cm.$^2$. The higher the heat treatment temperature up to 150°–170° C. the smaller was the pressure required for accomplishing the molding. This product had a specific impulse of 195 seconds at a combustion chamber pressure of 130 atmospheres.

EXAMPLE 3

The same procedure as stated in Example 2 was followed, expect that the 240 parts of eu-polyoxymethylene were replaced with 36.6 parts of the same and the 554 parts of potassium perchlorate were replaced with 63.4 parts of the same. The resulting product had a specific impulse of 209 seconds at a combustion chamber pressure of 130 atmospheres.

EXAMPLE 4

To a mixture of 15 parts of powdered polyoxymethylene, obtained by polymerizing in a solution of ether in an ice-water bath formaldehyde resulting from the pyrolysis of alpha-polyoxymethylene, and 5 parts of polyoxymethylene diacetate with a melting point of approximately 95° C., were added 80 parts of powdered ammonium nitrate. The mixture was heated to 105° C. and forced into a pre-heated mold; the mold was cooled while subjecting the contents to a pressure of 300 kg./cm.$^2$; and the resulting molded product was removed from the mold. The product thus obtained had a specific impulse of 219 seconds at a combustion chamber pressure of 70 atmospheres. However, by increasing the formaldehyde polymer a little more, the molding was facilitated.

EXAMPLE 5

The same procedure as stated in Example 4 was followed, except that the 15 parts of powdered polyoxymethylene were replaced with 20 parts of the same, the 5 parts of polyoxymethylene diacetate were replaced with 6 parts of the same, and the 80 parts of ammonium nitrate were replaced by 45 parts of potassium perchlorate and 26 parts of hexogen. The resulting product had a specific impulse of 230 seconds at a combustion chamber pressure of 130 atmospheres.

EXAMPLE 6

61 parts of ammonium perchlorate and 13 parts of hexogen were pulverized and mixed, and this mixture was dried in a desiccator for more than 48 hours. The mold was filled with this fine powder in an amount such that the apparent specific gravity came to approximately 1.1. The air inside the mold was replaced with nitrogen which in turn was driven out, reducing the pressure, and then the mold was cooled to $-80°$ C. 26 parts of formaldehyde, which had been obtained by the pyrolysis of alpha-polyoxmethylene, were cooled and liquified, and held at $-80°$ C. This liquid was injected into the foregoing cooled mold through several openings provided for this purpose. After having completed the injection of this liquified formaldehyde, the temperature of the mold was raised to $-20°$ C. where it was held for approximately 24 hours, followed by 24 hours at 0° C. This completed the polymerization. The product thus obtained had a specific impulse of 229 seconds at a combustion chamber pressure of 70 atmospheres.

EXAMPLE 7

A mixture of 142 parts of powdered polyoxymethylene, obtained by polymerizing in a solution of ether in an ice-water bath formaldehyde resulting from the pyrolysis of alpha-polyoxymethylene, and 35 parts of polyoxymethylene diacetate with a melting point of approximately 95° C. were mixed with 198 parts of ammonium perchlorate and 125 parts of magnesium nitrate. The resulting finely powdered mixture was heated to 105° C. and forced into a pre-heated mold. The mold was then cooled while subjecting the contents to a pressure of 300 kg./cm². The product thus obtained had a specific impulse of 213 seconds at 70 atmospheres.

EXAMPLE 8

35.3 parts of lithium nitrate and 37.9 parts of hexogen were pulverized, mixed, and dried in a desiccator for approximately 48 hours. The mold was filled with this fine powder in an amount such that the apparent specific gravity came to approximately 1.15. Then 26.8 parts of the formaldehyde obtained by the pyrolysis of alpha-polyoxymethylene were injected into the mold in a manner similar to that mentioned in the above Example 4 and the polymerization was completed. The product thus obtained had a specific impulse of 217 seconds at a combustion chamber pressure of 70 atmospheres.

EXAMPLE 9

A mixture of 23.1 parts of powdered polyoxymethylene, obtained by polymerizing in a solution of ether in an ice-water bath formaldehyde resulting from the pyrolysis of alpha-polyoxymethylene, and 6 parts of polyoxymethylene diacetate with a melting point of approximately 95° C. was mixed with 49 parts of ammonium perchlorate and 21.9 parts of potassium permanganate. The resulting finely powdered mixture was molded in a manner similar to that described in Example 5. The product thus obtained had a specific impulse of 208 seconds at a combustion chamber pressure of 70 atmospheres.

EXAMPLE 10

While a diisocyanate derivative of a formaldehyde polymer obtained by slowly reacting 20 parts of paraformaldehyde with 3 parts of naphthylene diisocyanate was being calendered with rollers, 68 parts of finely powdered ammonium perchlorate were added and kneaded in such a manner as to obtain the maximum homogeneity. This was further kneaded while 0.2 part of ethylene diamine was sprayed into the mixture. From the resulting sheet, the required amount was cut off, placed in a mold and left at room temperatures for approximately 96 hours under a pressure of 300 kg./cm². Then while still subjected to a pressure of 300 kg./cm.², the contents of the mold were heated to 80° C. for 30 minutes. The product thus obtained had a specific impulse of 221 seconds at a pressure of 70 atmospheres.

EXAMPLE 11

22.9 parts of powdered polyoxymethylene, obtained by polymerizing in ether in an ice-water bath formaldehyde resulting from the pyrolysis of alpha-polyoxymethylene, and 7 parts of polyoxymethylene diacetate with a melting point of approximately 95° C. were mixed with 70.1 parts of ammonium perchlorate and were formed in a manner similar to that described in Example 7. The product thus obtained had a specific impulse of 221 seconds at a combustion chamber pressure of 70 atmospheres.

EXAMPLE 12

The diisocyanate derivative of a formaldehyde polymer obtained by slowly reacting 20 parts of alpha-polyoxymethylene with 3 parts of naphthylene diisocyanate was employed with 68 parts of finely pulverized ammonium perchlorate and 0.3 part of ethylene diamine. Procedures similar to those described in Example 10 were followed. The product thus obtained had a specific impulse of 221 seconds at a pressure of 70 atmospheres.

EXAMPLE 13

The diisocyanate derivative of a formaldehyde polymer obtained by slowly reacting 20 parts of para-formaldehyde with 3 parts of tolylene diisocyanate was employed with 68 parts of finely pulverized ammonium perchlorate and 0.3 part of ethylene diamine. Procedures similar to those described in Example 10 were followed. The product thus obtained had a specific impulse of 221 seconds at a pressure of 70 atmospheres.

It is also possible to mix the diisocyanate derivatives of formaldehyde polymers obtained in Examples 10, 12, and 13 with other propellant components and to accomplish the forming of the product by means of extrusion. The diisocyanate derivatives of formaldehyde polymers are normally obtained by adding formaldehyde polymers to diisocyanates dissolved in a solvent, causing the suspension therein of the formaldehyde polymers and the reaction to take place. It is also possible with this method, provided that the control of the reaction is aptly carried out, to obtain the product in powdered form. In this instance, the separation of the diisocyanate derivative from the solvent is facilitated, and moreover, the moldability is also improved.

In order to clearly show the excellent combustibility as well as the high specific impulses of typical propellants embodying my invention, in the following table, some of propellants obtained in the above examples will be compared with other conventional propellants. In the table, items Nos. 1, 2, 6, 7, and 11 represent those propellants obtained by following the procedures as described in the Examples 3, 5, 11, 6 and 4, respectively. The specific impulses of items Nos. 1–5 and 6–14 were measured at combustion chamber pressures of 130 and 70 atmospheres respectively.

The specific impulses of the composite propellants were measured mechanically with a scale by mounting a miniature rocket on a roller-type stand. The total impulse was obtained by the integration of the graphic representation of the impulse and time curves, and this was divided by the weight of the composite propellant consumed. At the same time, the combustion pressure was measured with an electrical resistance manometer for high temperature use. The specific impulses were obtained by conversion to their values at the pressures of 70 atmospheres or 130 atmospheres using the following formula:

$$\frac{I_{sp}.A}{I_{sp}.B} = \sqrt{\frac{1-\left(\frac{P_eA}{P_cA}\right)^{\frac{k-1}{k}}}{1-\left(\frac{P_eB}{P_cB}\right)^{\frac{k-1}{k}}}}$$

wherein $I_{sp}$ is the specific impulse, $P_c$ is the combustion pressure, $P_e$ is the outside pressure (one atmosphere being assumed), $k = C_p/C_v$ wherein $C_p$ is the specific heat at constant pressure and $C_v$ s the specific heat at constant volume of the generated gas, and A and B are suffixes.

The following method was used in measuring the combustion stability. A glass tube having an inside diameter of 1.5 cm. and one end closed was stood on end with its open end facing upwards. The tube was filled with the comminuted and mixed fuel, binder and oxysalt, ignited with a Nichrome wire, and its combustion speed was compared with that of hydrocarbon and ammonium perchlorate, which was used as the standard. The simultaneously emitted flames were observed and the changes in the sizes and forms thereof were compared. Those in which the flames showed small change and the combustion speeds were high were adjudged to be superior. Propellants consisting of 20% formaldehyde polymers and 80% ammonium nitrate did not show much change in their flames, but their combustion speeds were slow. Those consisting of naphthalene or polyethylene and ammonium nitrate did not burn well. Those consisting of formaldehyde polymers and potassium perchlorate or ammonium perchlorate not only showed small change in their flames, but their combustion speeds were also high.

Table
COMPARISON OF COMBUSTIBILITY AND SPECIFIC IMPULSE

| Item | Composition | (Percent by weight) | Combustion Stability | Specific Impulse (Seconds) |
|---|---|---|---|---|
| No. 1 | KClO₄, 63.4 | Formaldehyde Polymers, 36.6 | Excellent | 209 |
| No. 2 | KClO₄, 45.0 | Formaldehyde Polymers, 26.0; Hexogen, 29.0 | ----do---- | 230 |
| No. 3 | KClO₄, 80.0 | Asphalt, 20.0 | Average | 194 |
| No. 4 | KClO₄, 80.0 | Polyethylene, 20.0 | ----do---- | 193 |
| No. 5 | KClO₄, 80.0 | Naphthalene, 20.0 | ----do---- | 197 |
| No. 6 | NH₄ClO₄, 70.1 | Formaldehyde Polymers, 29.9 | Excellent | 221 |
| No. 7 | NH₄ClO₄, 61.0 | Formaldehyde Polymers, 26.0; Hexogen, 13.0 | ----do---- | 229 |
| No. 8 | NH₄ClO₄, 80.0 | Asphalt, 20.0 | Average | 206 |
| No. 9 | NH₄ClO₄, 80.0 | Polyethylene, 20.0 | ----do---- | 213 |
| No. 10 | NH₄ClO₄, 80.0 | Naphthalene, 20.0 | ----do---- | 212 |
| No. 11 | NH₄NO₃, 80.0 | Formaldehyde Polymers, 20.0 | Good | 219 |
| No. 12 | NH₄NO₃, 80.0 | Asphalt, 20.0 | Slightly inferior | 171 |
| No. 13 | NH₄NO₃, 80.0 | Polyethylene, 20.0 | ----do---- | 176 |
| No. 14 | NH₄NO₃, 80.0 | Naphthalene, 20.0 | ----do---- | 177 |

In the cases of items Nos. 1, 2, 6, 7, and 11, which are typical embodiments of my invention, the formaldehyde polymer acting as a combined fuel-binder component is more than 20% and the oxygen donor component of the composite is an amount equal to 75% of that required for perfect oxidation. Normally, the specific impulse attains its maximum value when the amounts of the formaldehyde polymer and the oxygen donor are approximately as indicated above.

When other types of fuels are used, as in items Nos. 3, 4, 5, 8, 9, 10, 12, 13, and 14, the maximum specific impulse is attained with an amount of the fuel representing less than 20% by weight of the composite propellant. However, if the amount of fuel is reduced too much, the combustion stability will suffer, and moreover, where the fuel also acts as a binder, the moldability will also be unsatisfactory. From the standpoint of moldability, especially with plastic materials such as polyethylene and asphalt, it is preferable that the binder constitute more than 25% of the composition.

It will be appreciated that many modifications can be made in the compositions of the composite propellants embodying my invention as given in the specific examples and that the above disclosure is to be interpreted as setting forth the general principles of this invention and preferred compositions and not as limitations on the claims appended hereto.

What I claim is:

1. A composite propellant consisting essentially of a fuel component selected from the group consisting of polyoxymethylene diacetates, polyoxymethylene dimethyl ethers, the addition reaction products of polyoxymethylene glycols and polyisocyanates having at least two isocyanate groups per molecule, the addition reaction products of paraformaldehyde and polyisocyanates having at least two isocyanate groups per molecule, and mixtures thereof; and at least one solid, inorganic oxidizing salt as an oxidizing agent; said selected fuel component being present in an amount equal to from 2 to 60%, by weight, of said composite propellant and said oxidizing agent being present in an amount equal to at least 24%, by weight, of said composite propellant.

2. A composite propellant as in claim 1; wherein said fuel component is polyoxymethylene diacetate.

3. A composite propellant as in claim 1; wherein said fuel component is the addition reaction product of paraformaldehyde and naphthylene diisocyanate.

4. A composite propellant as in claim 1; wherein said fuel component is the addition reaction product of paraformaldehyde and tolylene diisocyanate.

5. A composite propellant as in claim 1; wherein said fuel component is the addition reaction product of alpha-polyoxymethylene and naphthylene diisocyanate.

6. A composite propellant as in claim 1; wherein said fuel component is a mixture of polyoxymethylene diacetate and polyoxymethylene obtained by the polymerization, in a solution of ether in an ice-water bath, of formaldehyde resulting from pyrolysis of alpha-polyoxymethylene.

References Cited in the file of this patent
UNITED STATES PATENTS

| | | |
|---|---|---|
| 2,159,234 | Taylor | May 23, 1939 |
| 2,434,872 | Taylor et al. | Jan. 20, 1948 |
| 2,622,277 | Bonell et al. | Dec. 23, 1952 |
| 2,646,596 | Thomas et al. | July 28, 1953 |
| 2,742,672 | Thomas | Apr. 24, 1956 |
| 2,871,224 | Cadle et al. | Jan. 27, 1959 |

OTHER REFERENCES

Zaehringer: "Solid Propellant Rockets—Second Stage," American Rocket Co., Box 1112, Wyandotte, Mich., September 1958, pp. 209–19.

Noland: Chemical Engineering, May 19, 1958, p. 115.

Chem. and Eng. News, May 27, 1957, pp. 21–23.

Zaehringer: Modern Plastics, vol. 34, October 1956, pp. 148–51 and 284.

Dombrow: "Polyurethanes," Reinhold Publ. Corp., New York, N.Y., page 4.